United States Patent [19]
Shen et al.

[11] Patent Number: 6,043,846
[45] Date of Patent: Mar. 28, 2000

[54] PREDICTION APPARATUS AND METHOD FOR IMPROVING CODING EFFICIENCY IN SCALABLE VIDEO CODING

[75] Inventors: Sheng Mei Shen; Thiow Keng Tan, both of Singapore, Singapore

[73] Assignee: Matsushita Electric Industrial Co., Ltd., Osaka-fu, Japan

[21] Appl. No.: 08/749,849

[22] Filed: Nov. 15, 1996

[51] Int. Cl.[7] ................................................. H04N 7/12
[52] U.S. Cl. ..................... 348/409; 348/410; 348/413; 348/416; 348/699; 382/232; 382/236; 382/238
[58] Field of Search ................................ 348/397, 398, 348/399, 409, 415, 413, 416, 384, 390, 400, 401, 402, 699; 358/135, 136; 382/232, 236, 238

[56] References Cited

U.S. PATENT DOCUMENTS

| | | | |
|---|---|---|---|
| 5,276,525 | 1/1994 | Gharavi | 358/261.1 |
| 5,349,383 | 9/1994 | Parke et al. | 348/405 |
| 5,414,469 | 5/1995 | Gonzales et al. | 348/408 |
| 5,418,571 | 5/1995 | Ghanbari | 348/416 |
| 5,539,466 | 7/1996 | Igarashi et al. | 348/401 |
| 5,592,226 | 1/1997 | Lee et al. | 348/413 |
| 5,612,735 | 3/1997 | Haskell et al. | 348/43 |
| 5,633,682 | 5/1997 | Tahara | 348/384 |
| 5,742,343 | 4/1998 | Haskell et al. | 348/415 |
| 5,742,892 | 4/1998 | Chaddha | 455/55.1 |
| 5,757,971 | 5/1998 | Kim | 382/241 |

*Primary Examiner*—Bryan Tung
*Assistant Examiner*—Tung Vo
*Attorney, Agent, or Firm*—Wenderoth, Lind & Ponack, L.L.P.

[57] ABSTRACT

A prediction method, merged method, has been introduced in the enhancement layer of a multiple layer video coding. This merged method was designed to efficiently handle the prediction of the non moving parts in coding of the enhancement layer VOP or frame. All the information for this merged mode prediction is obtained from the base layer, and no additional side information is transmitted. This prediction mode when used together with combination of the existing forward mode, backward mode, and interpolated mode, can improve the coding efficiency for enhancement layer video coding, especially in low bit rate coding. The method can be used in most multiple layer video coding schemes, especially in spatial scalability video coding.

36 Claims, 7 Drawing Sheets

PREDICTION APPARATUS AND METHOD FOR IMPROVING CODING EFFICIENCY IN SCALABLE VIDEO CODING

BACKGROUND OF THE INVENTION

1. Field of the Invention

The present invention relates to a prediction apparatus and method for improving coding efficiency in scalable video coding which is very useful in the multiple layer video coding, especially in spatial scalability video coding, where information from base band is always available to be used for coding its enhancement band signal.

2. Description of the Prior Art

In single layer video coding, motion estimation and compensation is used to reduce the redundancy between temporally adjacent frames. In the existing standard of MPEG-1. MPEG-2, and H.263 there are forward, backward, interpolated, as well as direct mode of motion estimation and compensation. Regardless of the mode selected based on the mode decision method, the final objective is to obtain th most accurate prediction that can be represented by the minimum number of bits. In the case of the single layer coding, there is no other information to be used for prediction except the adjacent frames in the same sequence. In multiple layer video coding, the prediction in the enhancement band can use information from both the enhancement band and its base band.

In the development of MPEG-4 standard, she spatial scalability video coding was introduced, see MPEG-4 Video Verification Model Version 4.0 [1], where the structure of the spatial scalability is set up, shown in FIG. 1.

As shown in FIG. 1, P-VOP(video object plane) in the base layer is predicted from its immediate previous VOP, P-VOP in the enhance layer is predicted from I-VOP in the base layer, and B-VOP in the enhance layer is predicted from its immediate previous P-VOP or B-VOP, called forward mode, from the P-VOP with the same time reference in the base layer, called backward mode, as well as from the averaging of these two, called interpolated mode.

As we know, the prediction from base layer to its enhance layer, is affected by an up-sampling filter. No matter how well the filter is designed, the up-sampled P-VOP is always short of some information compared with the previous P-VOP in the enhance layer. It was also found in our experiments that when the forward mode, backward mode, and interpolated mode are used for the prediction of B-VOP in the enhance layer, for motion image parts forward mode was almost chosen, and for still image parts interpolated mode was almost chosen. That is to say, a very small percentage is for backward mode, shown in FIG. 2. FIG. 2 shows a prediction result using a typical test sequence (container ship) according to the prior art, and in FIG. 2, "F" represents the forward mode, "I" represents the interpolated mode, and "B" represents the backward mode. The total bit used is 4096, SNRY is 30.94, SNRU is 38.70, and SNRV is 38.36.

If we check the coding efficiency for this coding scheme, for interpolated mode we have to code and transmit both forward and backward motion vectors, which consume a lot of bits, especially in the case of low bit rate coding. On the other hand, for still image parts we should not code and transmit anything, if we can tell the decoder which parts belong to still image parts.

From the above, it is clear that the prior art does not provide an efficient coding for B-VOP in the enhance layer.

The up-sampled P-VOP is not very reliable as the predictor for B-VOP in backward mode. This also means that the interpolated mode resulting from backward and forward mode is also unreliable. It is therefore necessary to introduce or design another prediction mode besides the forward mode for prediction of moving parts of the image.

The new prediction mode disclosed in this invention handles the coding of non moving parts of the image or VOP. Furthermore the new mode improves the coding efficiency of the overall multiple layer coding scheme by reducing the amount of residual information that is coded and also by inferring as much information as possible from the base layer.

In this invent-on, one more prediction mode will be added into the existing three modes: forward, backward, and interpolated mode. The forward mode addresses the coding of moving parts or VOPs, the new mode addresses the coding of non moving parts or VOPs, and interpolated and backward modes address the uncertain parts which cannot be predicted very well by forward mode nor the new mode.

SUMMARY OF THE INVENTION

As shown as in FIG. 1, the P-VOP in the base layer is predicted from its immediate previous I-VOP or P-VOP. This is an accurate prediction. The difference of up-sampled P-VOP with its immediate previous up-sampled I-VOP or P-VOP contains useful information i.e., where the pixel content has changed and where it has not. This information, changed or unchanged, can be used for the prediction of B-VOP in the enhance layer, since the relationship of B-VOP to its immediate previous P-VOP or B-VOP in the enhance layer is the same as the relationship of P-VOP to its immediate previous I-VOP or P-VOP in the base layer.

By using the information obtained from the base layer, a new VOP or frame, called merged VOP or frame can be constructed. This new VOP or frame, as one of the reference VOP or frame, can provide a better prediction than the interpolated and backward mode for non moving parts in the coding of B-VOP. Thus a well designed B-VOP prediction is formed by employing forward mode, the new mode, backward mode, and interpolated mode. The new mode does not require the coding nor transmission of any information. The information is available both at the encoder and the decoder. This prediction mode is hereafter referred to as the Merged Mode.

The invention comprises the following steps:

1) Up-sample P-VOP and its immediate previous I-VOP or P-VOP in the base layer;
2) obtain the difference between up-sampled P-VOP and its immediate previous up-sampled I-VOP or P-VOP;
3) thresholding the difference values obtained from 2), to classify the pixels as moving or non moving;
4) construct the Merged VOP or frame by filling with the pixels of the immediate previous P-VOP or B-VOP from the enhance layer for the non moving parts, filling with the pixels of its up-sampled P-VOP from the base layer for moving parts;
5) select one of the mode among forward mode, merged mode, backward mode and interpolated mode, based on the decision method. Since the merged mode does not need to code and transmit motion vectors, the decision criteria is biased in the favor of the merged mode; and
6) accordingly, to re-define the header bits, such as COD, MODB, MBTYPE to include these four prediction modes into the syntax.

BRIEF DESCRIPTION OF THE DRAWINGS

Figure 2:
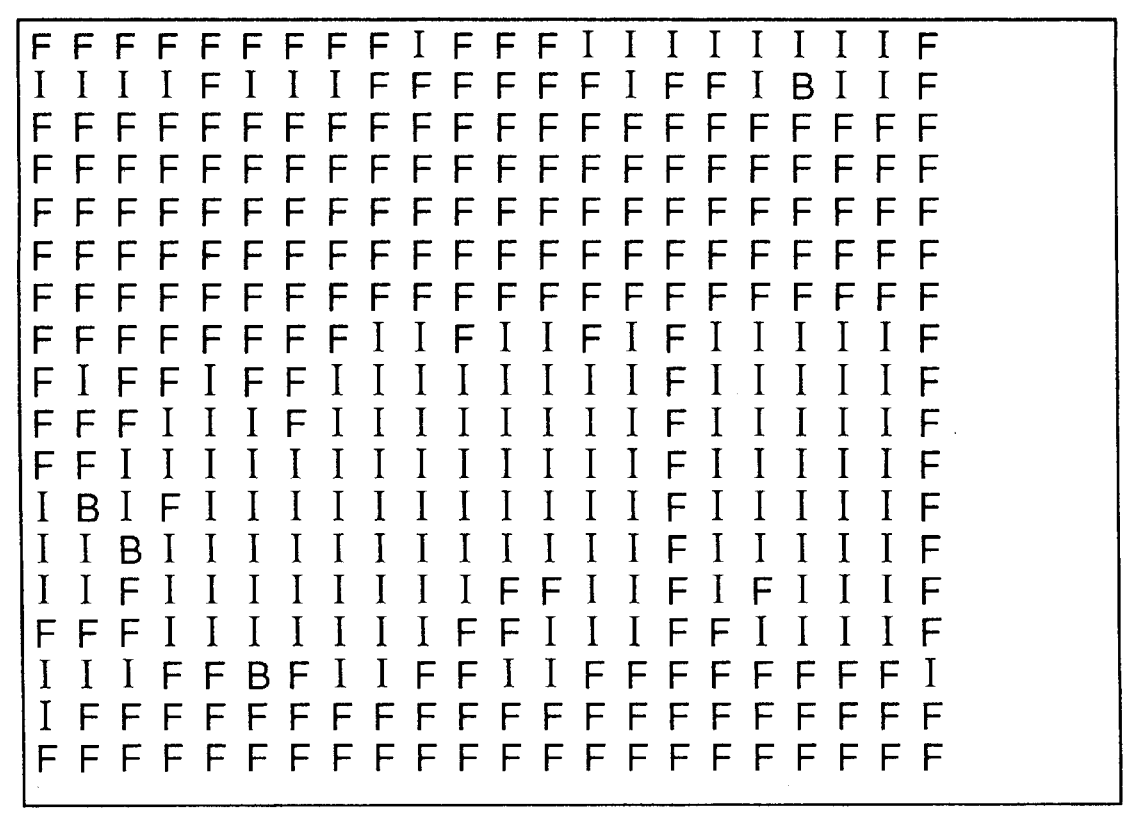

FIG. 2 is a diagram showing a prediction result for enhancement layer by using the current coding technology in spatial scalability in which the distribution of the prediction modes of each macro block among the three prediction modes: Forward, Backward, and Interpolated, is shown.

FIG. 7 is a diagram showing the improvement of the coding efficiency by introducing the new prediction mode, Merged Mode.

DESCRIPTION OF PREFERRED EMBODIMENTS

The preferred embodiment of the current invention involves introduction of a merged mode for improving enhancement layer video coding efficiency in multiple layer video coding, especially in spatial scalability video coding. By making use of the base band information, a new merged VOP or frame is constructed. The new merged mode allows more accurate and efficient prediction of the enhancement layer VOP or frame. The details can be explained with FIGS. 3, 4, 5 and 6.

Figure 3:
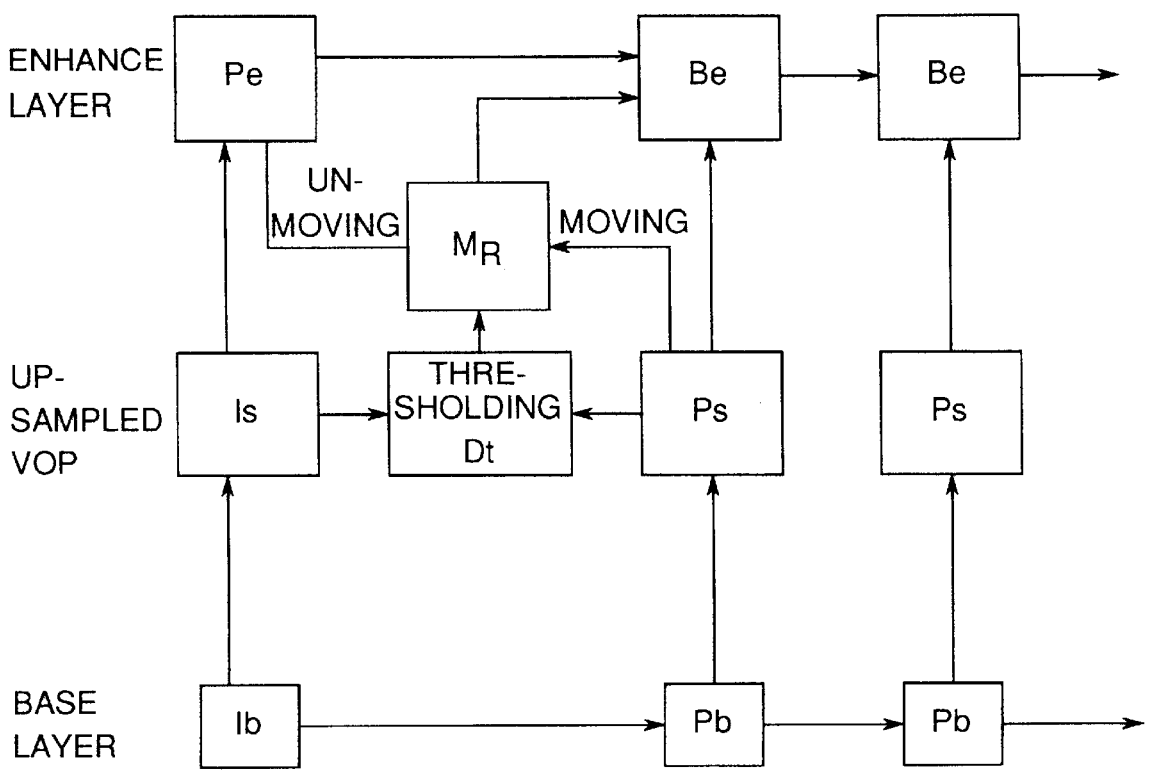
FIG. 3 is a diagram showing the general structure according to the present invention where a new Merged VOP or Frame are formed based on the information from the base layer, and it is used to predict the enhancement layer as one of the reference.

The general diagram for spatial scalability with two layers, consisting of a base layer and an enhance layer is shown in FIG. 3. Here in the base layer Ib means Intra VOP or frame, and Pb means Predicted VOP or frame. In the enhance layer Pe means Predicted VOP or frame, and Be means Bi directional(actually more than one direction) predicted VOP or frame. In FIG. 3, between the base layer and the enhance layer the up-sampled VOP or frame is also shown for explanation. Is is the up-sampled VOP from Ib, Ps is the up-sampled VOP from Pb.

Dt is the difference VOP between the up-sampled VOP Is and Ps with thresholding(here a value of 12 is used). MR is the new merged VOP from Pe and Ps based on Dt-VOP. If a pixel in Dt-VOP is zero, then the pixel of the same position in MR Will come from Pe, otherwise from Ps.

Figure 4A:
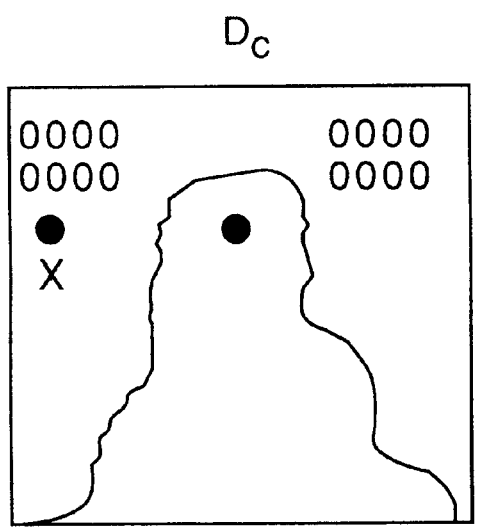
FIGS. 4A and 4B are diagrams showing the construction of the new merged VOP or frame based on the theresholded difference VOP of frame.
Figure 4B:
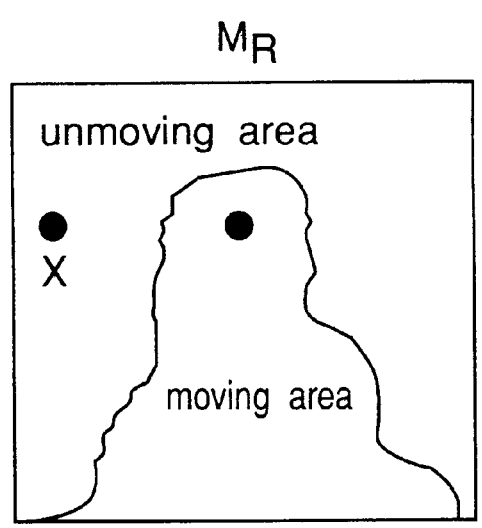

As shown in FIG. 4, x represents the same position in Dt-VOP and MR-VOP. The difference value after thresholding for the x position in DT-VOP is zero, so the pixel value for the x position in MR-VOP will be taken from Pe-VOP, the value in the same position of x. Similarly, for the y position of MR-VOP the pixel value will be taken from Ps-VOP since the pixel value in the same y position of Dt-VOP is not zero. It is clear that for the non moving pixels, the information taken from Pe-VOP in the same enhancement layer is the most accurate. On the other hand, for moving pixels, the information taken from PS-VOP will reflect the situation of movement from Pe-VOP to Be-VOP. This is because Ps-VOP is the up-sampled VOP from Pb-VOP, and Pb-VOP is predicted from Ib-VOP which is at the same time reference as Pe-VOP, shown as in FIG. 3.

Figure 5:
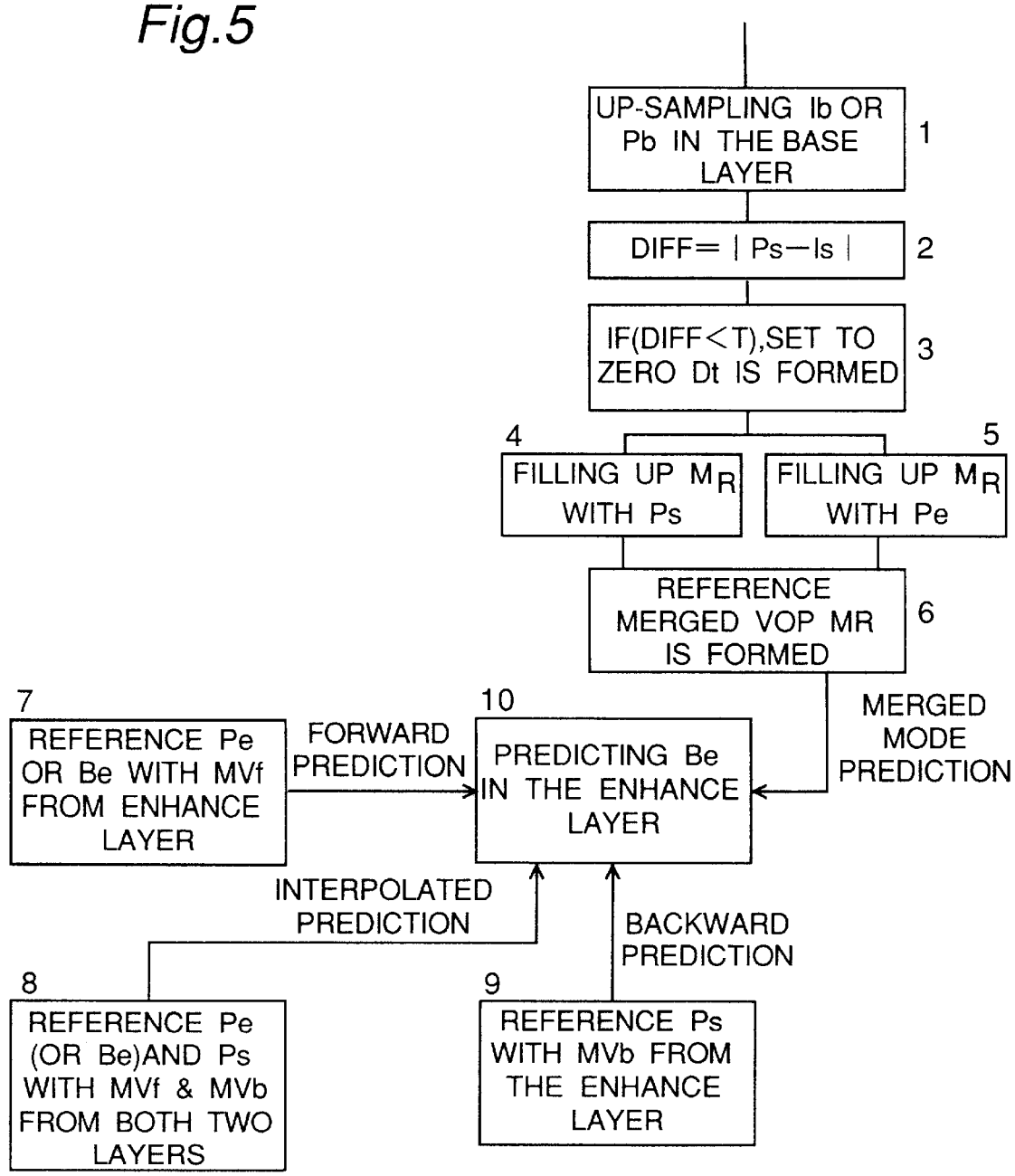
FIG. 5 is a flow chart showing the details on the construction of the merged VOP or frame, as well as the prediction of the enhancement layer from four prediction modes.

FIG. 5 shows the details of the prediction of Be-VOP in the enhance layer. The literal 1 is for up-sampling Ib and Pb of the base layer, to obtain the up-sampled VOP Is and Ps. The literal 2 is to obtain the difference between the up-sampled VOP Is and Ps. The literal 3 is for thresholding the difference values to construct a VOP Dt Based on the VOP Dt, the literal 4 is for assigning the pixels in the new VOP MR with the pixel values of the VOP Pe from the enhance layer for those areas with zeros in Dt, and the literal 5 is for assigning the pixels in the new MR with the pixel values of the up-sampled VOP Ps for those areas with non-zeros in Dt. The literal 6 is the new merged VOP MR from the literal 4 and 5.

In FIG. 5, the literal 10 is the current VOP Be, that will be predicted from three reference VOPs, Pe in the literal 7, Ps in the literal 9, and MR in the literal 6. Four prediction modes, forward mode from Pe, backward mode from Ps, merged mode from MR, and interpolated mode from the averaging of Pe and Ps in the literal 8, will be evaluated and the mode that achieves the best prediction selected.

Figure 6:
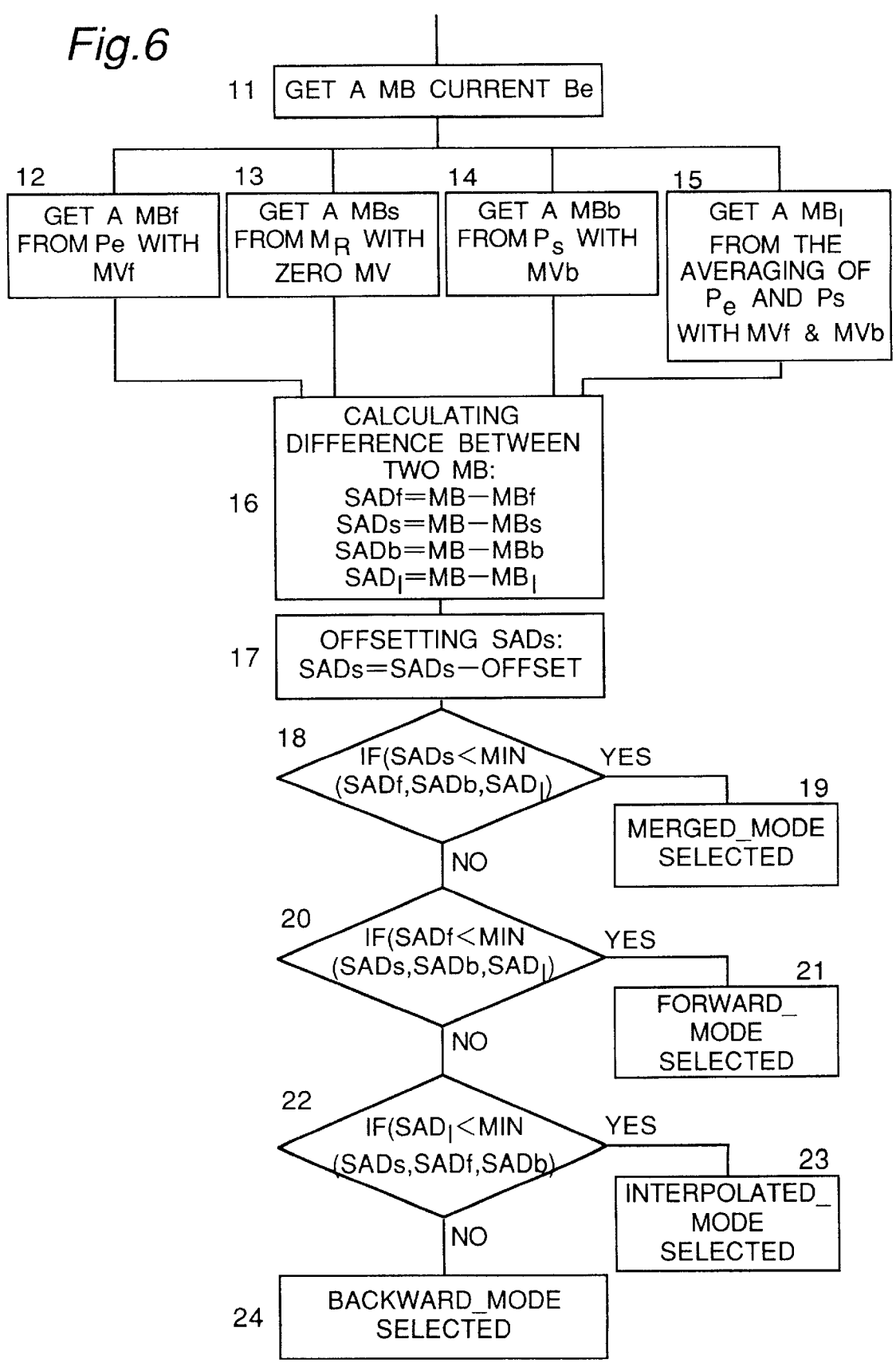
FIG. 6 is a flow chart showing the whole process of the decision on the four prediction modes.

The evaluation of modes is shown in FIG. 6. The literal 11 obtains a Macro Block, MB, from the current Be. The literal 12 obtains a Macro Block, MBf, from Pe based on MVf (motion vector), the literal 13 obtains a Macro Block, MBR, from MR with zero motion vector, the literal 14 obtains a Macro Block, MBb, from Ps based on MVb (motion vector), and the literal 15 obtains a Macro Block, MBi, from the averaging of Pe and Ps based on MVf and MVb.

In the literal 16 of FIG. 6, the sum of absolute differences between each pair of Macro Blocks is calculated, and results in:

SADf=MB–MBf

SADs=MB–MBs

SADb=MB–MBb

SADi=MB–MBi

The literal 17 offsets SADs by a small number, to compensate the bits saving for merged mode, when it is compared with the bits use in coding motion vectors for the other three modes. In the literal 18, if SADs is less than the other three SAD, then the merged mode is selected as indicated by the literal 19, otherwise SADf will be checked as indicated by the literal 20. Similarly if SADf is less than the other three SAD, then forward mode is selected as indicated by the literal 21. SADi is checked in the literal 22, and if the condition is true, then interpolated mode will be selected as indicated by the literal 23, otherwise backward mode is chosen as indicated by the literal 24.

For these four prediction modes, based on our experiments the VLC(variable Length Code) for coding each MB prediction mode is given as follows:

Merged mode: 1 forward mode: 01 interpolated mode: 001 backward mode: 0001

We define the coding block pattern cbp=0 to mean no coefficient is coded. For this case, if a MB is set to merged mode then this MB can be skipped, because no motion vectors or any other information need to be coded and transmitted. This is a special case which can save a lot of header bits and happens quite often for still image areas.

Figure 7:
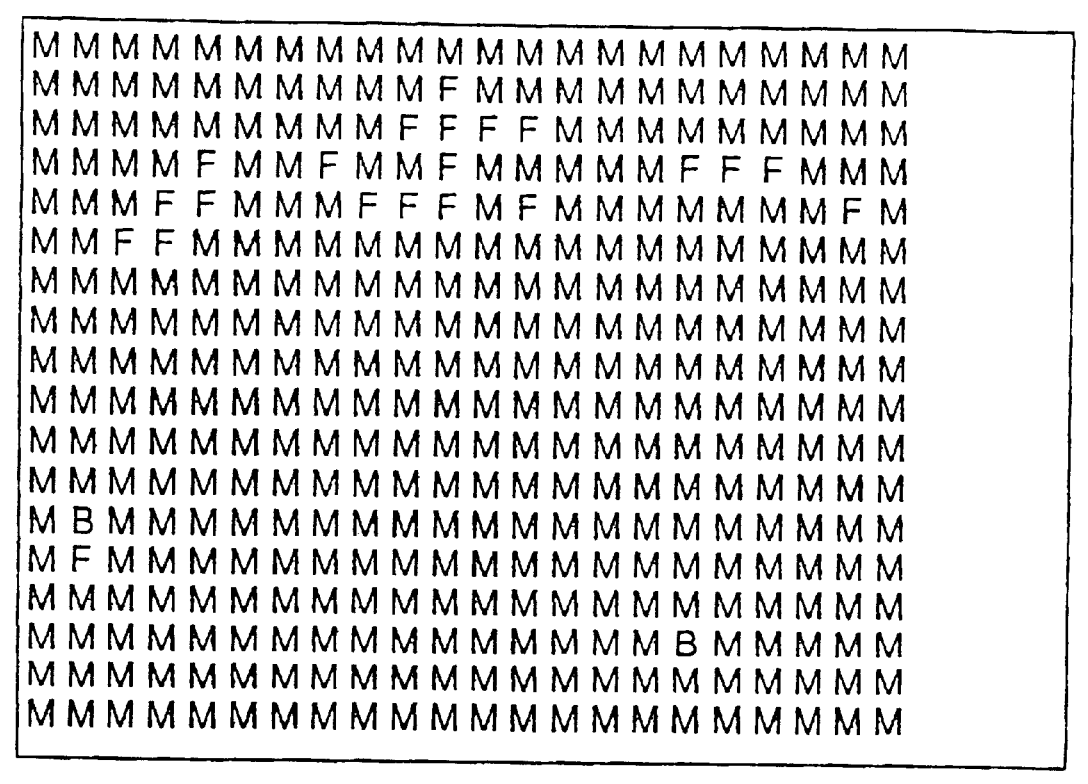

The effects of this invention is to improve the compression without loss in quality for multiple layer video coding. As shown in FIG. 7, showing a prediction result using a typical test sequence (container ship), 92.4% of the macro blocks are chosen merged mode, indicated as "M" in FIG. 7. In FIG. 7, "F" represents the forward mode, "I" represents the interpolated mode, and "B" represents the backward mode.

Figure 1:
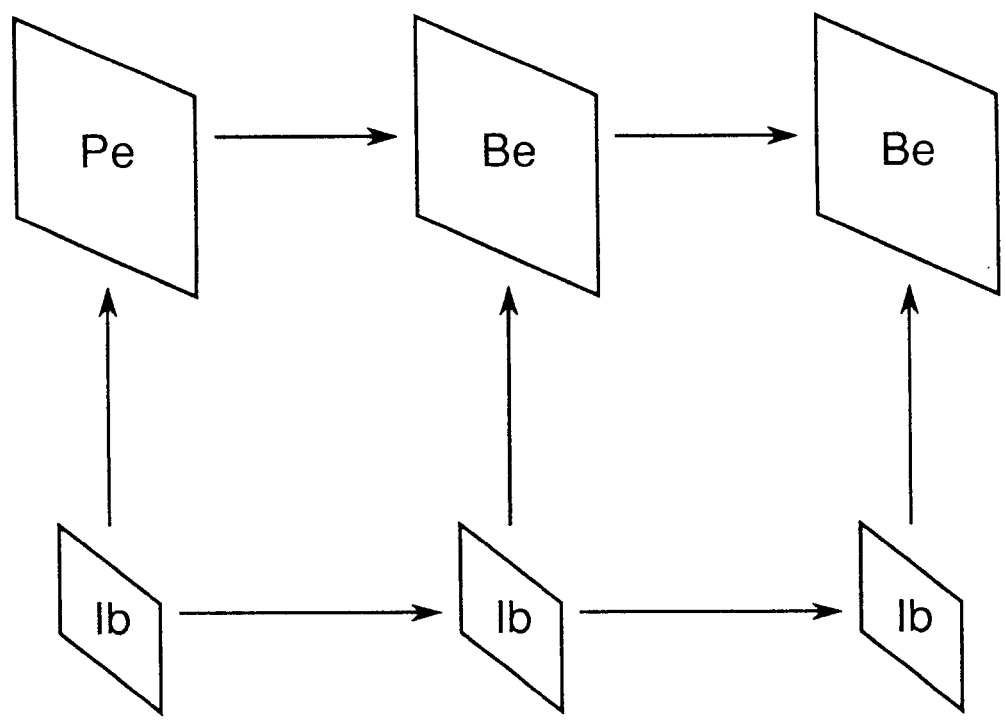
FIG. 1 is a diagram showing the main structure of the current spatial scalability prediction.

Compared to the prior art in FIG. 1, (4096−1747)409× 100%=57% of bit saving is achieved, for the typical test sequence called Container Ship. It can be seen from FIGS. 1 and 7 that still areas that were originally coded with "I" mode (interpolated mode) tend to be coded to the merged mode, "M" in FIG. 7, and for the top and bottom areas that are considered non moving, the modes are also changed from "F" (forward mode) to the merged mode. This is because the merged mode does not need to code motion vectors and can predict accurately for still image parts, so a lot of bit saving can be achieved.

As the coding bit rate is lowered, the effect of this invention will become clearer because the bits used for motion vectors begin to occupy a more significant portion of the total bit-rate.

What is claimed is:

1. A prediction method for improving coding efficiency by reducing temporal redundancy in an enhancement error signal of a multiple layer video encoding system, the prediction method comprising:

dividing an input video sequence into a plurality of video object layers each consisting of a base layer and several enhancement layers, and each of the video object layers are further made up of a series of video object planes (VOP) comprising a two dimensional array of sampled pixel data at a particular time reference;

encoding a VOP of the base layer to obtain a compressed bitstream and a corresponding locally decoded VOP of the base layer;

obtaining a pixel classification criteria from information in current and previous locally decoded VOP of the base layer;

constructing a merged VOP, from a previous locally decoded VOP of an enhancement layer, the previous locally decoded VOP of the base layer, the current locally decoded VOP of the base layer and the pixel classification criteria;

predicting an enhancement layer VOP from: the merged VOP, the previous VOP in the same layer, and the VOP from the base layer with the same time reference;

entropy coding information for prediction modes as header information for the decoder;

coding prediction errors of the enhancement layer VOP which was predicted according to one of several prediction modes based on a mode decision, together with motion vector information, and transmitting them in a compressed bitstream to a decoder; and repeating the above prediction steps on the enhancement layers treating a lower of two enhancement layers as the base layer.

2. A prediction method for improving coding efficiency in multiple layer video coding according to claim 1 where obtaining the pixel classification criteria from the information in the current and previous locally decoded VOP of the base layer, further comprises:

up-sampling the base layer VOP by a filtering technique, if necessary, to form a scaled VOP of the same dimension as the enhancement layer; and classifying each pixel in the current VOP as changed or unchanged based on the magnitude of the difference between the current pixel and the pixel at a corresponding location in the previous VOP.

3. A prediction method for improving coding efficiency in multiple layer video coding according to claim 2 where constructing a merged VOP, from the previous locally decoded VOP of the enhancement layer, the previous locally decoded VOP of the base layer, the current locally decoded VOP of the base layer and the pixel classification criteria, further comprises:

selecting a first group of pixels for the merged VOP from the previous locally decoded VOP of the enhancement layer VOP at pixel locations classified as unchanged;

selecting a second group of pixels for the merged VOP from the up-sampled VOP of the same time reference, at pixel locations classified as changed; and constructing the merged VOP by merging the groups of first and second selected pixels together.

4. A prediction method for improving coding efficiency in multiple layer video coding according to claim 3 where the prediction of the enhancement layer VOP further comprises:

generating motion vectors from the previous locally decoded VOP of the enhancement layer, to be used for a forward motion compensation prediction mode;

generating the motion vectors from the up-sampled VOP with the same time reference as the current predicted VOP, to be used a backward motion compensation prediction mode;

searching for and obtaining a forward motion compensated macro block from previous locally decoded VOP of the enhancement layer, by using the forward motion vectors generated in the forward prediction mode for a current macro block;

searching for and obtaining a backward motion compensated macro block from the up-sampled VOP, of the same time reference as the current VOP, by using the backward motion vectors generated in the backward prediction mode for the current macro block;

averaging the forward motion compensated macro block and backward motion compensated macro block to obtain an interpolated macro block, for an interpolated prediction mode; and obtaining a macro block from the merged VOP for the merge prediction mode.

5. A prediction method according to claim 4 where the prediction of the enhancement layer further comprises:

calculating the absolute difference between the macro block from the current VOP and the corresponding forward motion compensated macro block of the forward prediction mode;

calculating the absolute difference between the macro block from the current VOP and the corresponding backward motion compensated macro block of the backward prediction mode;

calculating the absolute difference between the macro block from the current VOP and the corresponding interpolated macro block of the interpolated prediction mode;

calculating the absolute difference between the macro block from the current VOP and the corresponding merged macro block in the merged prediction mode;

selecting the prediction mode which results in the minimum absolute difference; and predicting each of the macro blocks by using the selected prediction mode.

6. A prediction method according to claim 5 where the prediction of the enhancement layer is biased towards selecting the merged mode.

7. A prediction method for improving coding efficiency in multiple layer video coding according to claim 2 where classifying each pixel in the current VOP into changed and unchanged, further comprises:

comparing the magnitude of the difference to a predefined threshold;

classifying the pixel as unchanged when the magnitude of the difference is less than or equal to the threshold; and classifying the pixel as changed when the magnitude of the difference is greater than the threshold.

8. A prediction method according to claim 4 wherein merging of the groups of selected pixels employs a smoothing filter or weighting function for pixels at a boundary between the groups of selected pixels.

9. A prediction method for improving coding efficiency in multiple layer video coding according to claim 5 where the prediction mode information is entropy coded, comprising:

obtaining statistics of the prediction mode selection;

assigning less bits for the prediction mode with the higher possibility of being selected, and more bits for the prediction mode with the lower possibility of being selected; and assigning a default made for macro-blocks that are not transmitted as the merged prediction mode with no prediction error coded.

10. A prediction method for improving coding efficiency in multiple layer video coding according to claim 1 where obtaining the pixel classification criteria from the information in the current and previous locally decoded VOP of the base layer, further comprises:

up-sampling the base layer VOP by a filtering technique, if necessary, to form a scaled VOP of the same dimension as the enhancement layer; and classifying each pixel in the current VOP as changed or unchanged based on the magnitude of the difference between the weighted sum of the current and surrounding pixels and the weighted sum of the pixels at corresponding locations in the previous VOP.

11. A prediction method for improving coding efficiency in multiple layer video coding according to claim 10 where constructing a merged VOP, from the previous locally decoded VOP of the enhancement layer, the previous locally decoded COP of the base layer, the current locally decoded VOP of the base layer and the pixel classification criteria, further comprises:

selecting a first group of pixels for the merged VOP from the previous locally decoded VOP of the enhancement layer VOP at pixel locations classified as unchanged;

selecting a second group of pixels for the merged VOP from the up-sampled VOP of the same time reference at pixel locations classified as changed; and constructing the merged VOP by merging the groups of first and second selected pixels together.

12. A prediction method for improving coding efficiency in multiple layer video coding according to claim 11 where the prediction of the enhancement layer VOP further comprises:

generating motion vectors from the previous locally decoded VOP of the enhancement layer, to be used for a forward motion compensation prediction mode;

generating the motion vectors from the up-sampled VOP with the same time reference as the current predicted VOP, to be used for a backward motion compensation prediction mode;

searching for and obtaining a forward motion compensated macro block from the previous locally decoded VOP of the enhancement layer, by using the forward motion vectors generated in the forward prediction mode for a current macro block;

searching for and obtaining a backward motion compensated macro block from the up-sampled VOP, of the same time reference as the current VOP, by using the backward motion vectors generated in the backward prediction mode for the current macro block;

averaging the forward motion compensated macro block and backward motion compensated macro block to obtain an interpolated macro block, for an interpolated prediction mode; and obtaining a macro block from the merged VOP for the merge prediction mode.

13. A prediction method according to claim 12 where the prediction of the enhancement layer further comprises:

calculating the absolute difference between the macro block from the current VOP and the corresponding forward motion compensated macro block of the forward prediction mode;

calculating the absolute difference between the macro block from the current VOP and the corresponding backward motion compensated macro block of the backward prediction mode;

calculating the absolute difference between the macro block from the current VOP and the corresponding interpolated macro block of the interpolated prediction mode;

calculating the absolute difference between the macro block from the current VOP and the corresponding merged macro block in the merged prediction mode;

selecting the prediction mode which results in the minimum absolute difference; and predicting each of the macro blocks by using the selected prediction mode.

14. The prediction method according to claim 13 where the prediction of the enhancement layer is biased towards selecting the merged mode.

15. A prediction method for improving coding efficiency in multiple layer video coding according to claim 10, where classifying each pixel in the current VOP into changed and unchanged, further comprises:

comparing the magnitude of the difference value to a predefined threshold;

classifying the pixel as unchanged when the magnitude of the difference is less than or equal to the threshold; and classifying the pixel as changed when the magnitude of the difference is greater than the threshold.

16. A prediction method according to claim 11 where merging of the groups of selected pixels further employs a smoothing filter or weighting function for pixels at a boundary between the groups of selected pixels.

17. A prediction method for improving coding efficiency in multiple layer video encoding and decoding according to claim 1, where the constructing of the merged VOP is done at the macro block level.

18. A prediction method for improving coding efficiency in multiple layer video encoding and decoding according to claim 1, where the prediction mode consists of a merge mode only.

19. A prediction method for improving coding efficiency in multiple layer video encoding and decoding according to claim 1, where the prediction mode consists of a merge mode and at least one of a forward, backward and interpolated modes.

20. A prediction method according to claim 1 where the VOP consists of arbitrarily shaped video objects.

21. A prediction method according to claim 1 where the VOP consists of rectangular shaped video frames.

22. A prediction method for improving coding efficiency by reducing temporal redundancy in an enhancement error signal of a multiple layer video decoding system, the method comprising:
   decoding a VOP of a base layer from a compressed bitstream to obtain a corresponding decoded VOP of the base layer;
   obtaining a pixel classification criteria from information in current and previous decoded VOP of the base layer;
   constructing a merged VOP, from a previous decoded VOP of an enhancement layer, the previous decoded VOP of the base layer, the current decoded VOP of the base layer and the pixel classification criteria;
   decoding information for prediction modes from header information transmitted by the encoder;
   decoding prediction errors of an enhancement layer VOP which was predicted according to a transmitted prediction mode, together with motion vector information received in the compressed bitstream;
   reconstructing the enhancement layer VOP from the merged VOP, the previous VOP in the same layer, and the VOP from the base layer with a same time reference; and
   repeating the above reconstruction steps on the enhancement layer treating a lower of two enhancement layers as the base layer.

23. A prediction method for improving coding efficiency in multiple layer video decoding according to claim 22 where obtaining the pixel classification criteria from the information in the current and previous decoded VOP of the base layer, further comprises:
   up-sampling the base layer VOP by a filtering technique, if necessary, to form a scaled VOP of the same dimension as the enhancement layer; and
   classifying each pixel in the current VOP as changed or unchanged based on the magnitude of the difference between the current pixel and the pixel at a corresponding location in the previous VOP.

24. A prediction method for improving coding efficiency in multiple layer video decoding according to claim 23 where constructing a merged VOP, from the previous decoded VOP of the enhancement layer, the previous decoded VOP of the base layer, the current decoded VOP of the base layer and the pixel classification criteria, further comprises:
   selecting a first group of pixels for the merged VOP from the previous decoded VOP of the enhancement layer VOP at pixel locations classified as unchanged;
   selecting a second group of pixels for the merged VOP from the up-sampled VOP of the same time reference, at pixel locations classified as changed; and
   constructing the merged VOP by merging the groups of first and second selected pixels together.

25. A prediction method for improving coding efficiency in multiple layer video coding according to claim 24 where the reconstruction of the enhancement layer VOP further comprises:
   using the decoded information of the prediction mode and motion vectors to obtain one of the following prediction macro-blocks,
   a forward motion compensated macro block from the previous locally decoded VOP of the enhancement layer,
   a backward motion compensated macro block from the up-sampled VOP, of the same time reference as the current VOP,
   an interpolated macro block which is the average of the forward motion compensated macro block and backward motion compensated macro block, or
   a macro block from the merged VOP; and
   adding the obtained prediction macro-block to a decoded prediction difference to obtain a reconstructed macro-block.

26. A prediction method according to claim 13 where merging of the groups of selected pixels further employs a smoothing filter or weighting function for pixels at a boundary between the groups of selected pixels.

27. A prediction method for improving coding efficiency in multiple layer video decoding according to claim 22 where obtaining the pixel classification criteria from the information in the current and previous decoded VOP of the base layer, further comprises:
   up-sampling the base layer VOP by a filtering technique, if necessary, to form a scaled VOP of the same dimension as the enhancement layer; and
   classifying each pixel in the current VOP as changed or unchanged based on the magnitude of the difference between the weighted sum of the current and surrounding pixels and the weighted sum of the pixels at corresponding locations in the previous VOP.

28. A prediction method for improving coding efficiency in multiple layer video decoding according to claim 27 where constructing a merged VOP, from the previous decoded VOP of the enhancement layer, the previous decoded VOP of the base layer, the current decoded VOP of the base layer and the pixel classification criteria, further comprises:
   selecting a first group of pixels for the merged VOP from the previous decoded VOP of the enhancement layer VOP at pixel locations classified as unchanged;
   selecting a second group of pixels for the merged VOP from the up-sampled VOP of the same time reference at pixel locations classified as changed; and
   constructing the merged VOP by merging the groups of first and second selected pixels together.

29. A prediction method for improving coding efficiency in multiple layer video coding according to claim 28 where the reconstruction of the enhancement layer VOP, further comprises:
   using the decoded information of the prediction mode and motion vectors to obtain one of the following prediction macro-blocks,
   a forward motion compensated macro block from the previous locally decoded VOP of the enhancement layer,
   a backward motion compensated macro block from the up-sampled VOP, of the same time reference as the current VOP,
   an interpolated macro-block which is the average of the forward motion compensated macro block and backward motion compensated macro block, or
   a macro block from the merged VOP; and
   adding the obtained prediction macro-bock to a decoded prediction difference to obtain a reconstruction macro-bock.

30. A prediction method according to claim 28 where merging of the groups of selected pixels further employs a smoothing filter or weighting function for pixels at a boundary between the groups of selected pixels.

31. A prediction method for improving coding efficiency in multiple layer video encoding and decoding according to claim 21, where the constructing of the merged VOP is done at the macro block level.

32. A prediction method for improving coding efficiency in multiple layer video encoding and decoding according to claim 21, where the prediction mode consists of a merge mode only.

33. A prediction method for improving coding efficiency in multiple layer video encoding and decoding according to claim 21, where the prediction mode consists of the merge mode and at least one of a forward, backward and interpolated modes.

34. A prediction method according to claim 21 where the VOP consists of arbitrarily shaped video objects.

35. A prediction method according to claim 21 where the VOP consists of rectangular shaped video frames.

36. A prediction apparatus for improving coding efficiency by reducing the temporal redundancy in a enhancement error signal of a multiple layer video encoding system, the apparatus comprising:

a divider which divides an input video sequence into a plurality of video object layers consisting of a base layer and several enhancement layers, and each video object layer further comprises a series of video object planes (VOP) comprising a two dimensional array of sampled pixel data at a particular time reference;

an encoder which encodes a VOP of the base layer to obtain a compressed bitstream and a corresponding locally decoded VOP of the base layer, an obtaining part which obtains a pixel classification criteria from information in the current and previous locally decoded VOP of the base layer;

a constructing part which constructs a merged VOP, from a previous locally decoded VOP of an enhancement layer, the previous locally decoded VOP of the base layer, the current locally decoded VOP of the base layer and the pixel classification criteria;

a prediction part which predicts an enhancement layer VOP from: the merged VOP, the previous VOP in the same layer, and the VOP from the base layer with the same time reference;

a coder which entropy codes information for prediction modes as header information for the decoder; and a coder which codes prediction errors of the enhancement layer VOP which was predicted according to one of several prediction modes based on a mode decision, together with motion vector information, and transmitting them in a compressed bitstream to a decoder;

wherein the prediction apparatus further operates by treating a lower of two enhancement layers as the base layer.

* * * * *